March 11, 1952     W. S. STUTZMAN     2,588,667
FLOAT OPERATED CONTROL
Filed Sept. 10, 1949
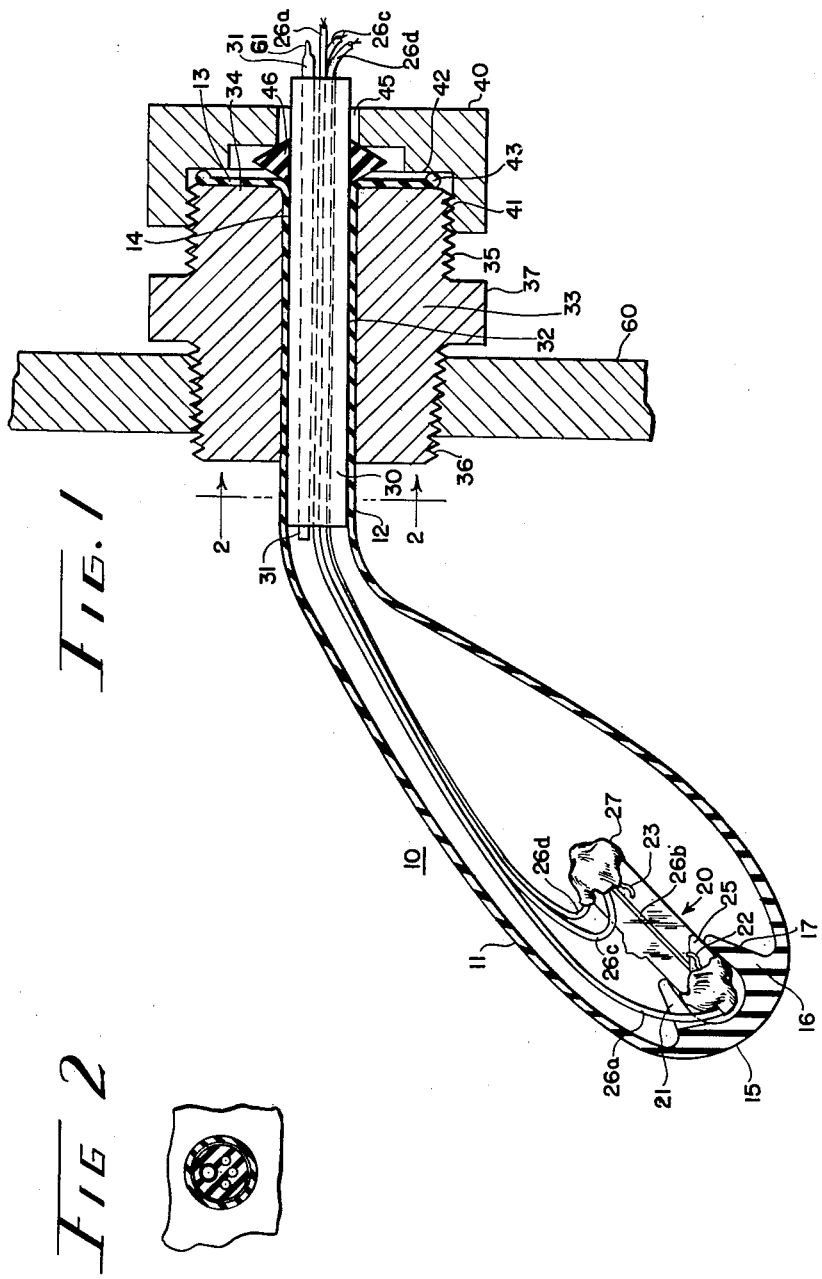
Inventor
WARREN S. STUTZMAN
By
George H Fisher
Attorney Patented Mar. 11, 1952

2,588,667

UNITED STATES PATENT OFFICE 2,588,667

FLOAT OPERATED CONTROL

Warren S. Stutzman, St. Paul, Minn., assignor to Minneapolis-Honeywell Regulator Company, Minneapolis, Minn., a corporation of Delaware Application September 10, 1949, Serial No. 114,968

5 Claims. (Cl. 200—84)

This invention relates to a new and novel design of a control device and more particularly to the design of a hollow or inflated float made of a flexible and expansible material.

In the past liquid level control devices such as floats have been made in varying shapes, both hollow and solid, and of varying materials including rubber. In all of the prior art designs of floats, however, there has been one common disadvantage in that all were susceptible to the formation of scale or lime deposit upon the float apparatus and its pivotal mounting structure such that the mass of the float changed thereby changing its buoyancy and causing malfunctioning in the operation of the float. Similarly the flexible mounting or pivot structure of the float was also affected by the lime deposit thereby rendering the control device inoperative or inaccurate.

The present invention provides a particular float design in which the body of the float consists of a thin wall of flexible and expansible material, such as rubber, so that when the float is located in a vessel and subjected to varying pressure the pressure variations will cause expansion and contraction of the float to prohibit the deposit of a scale thereon.

Further the particular float design provides a simple bag-like float member made entirely or rubber or other flexible and expansible material which is adapted to be so mounted to a wall of a vessel that it provides its own pivot structure.

It is therefore an object of this invention to provide a float, simple in design and economical to manufacture, which prohibits the formation of scale or deposit thereon thereby insuring continuous accuracy and reliability in operation.

It is also an object of this invention to provide a float design which provides its own pivot structure.

It is another object of this invention to provide a float design which is simple to install and requires a minimum amount of maintenance.

These and other objects of this invention will become apparent from a reading of the attached description together with the drawings wherein:

Figure 1 is a sectional view of the float mounted on a surface such as a boiler wall, and Figure 2 is a sectional view of the float taken along the line 2—2 of Figure 1.

My improved control device or float is a baglike container or member 10 of thin walled construction being made of a flexible and expansible material, such as rubber. It includes a main body portion 11 which tapers into a tube-like portion 12 having a flange or flared lip portion 13 at the open extremity 14, all of which portions are integral with one another and of the same material.

Main body portion 11 of float 10 has an increased wall thickness at the closed extremity 15 thereof, this extremity being shaped on its inner surface to form an annular cup-shaped holder 16 slightly tapered inwardly and having a wall 17 also tapered inwardly, this wall being made of the same material as the float and integral with the float main body portion. Holder 16 through its tapered wall portion 17 provides a recess and gripping surface in which a control device such as a mercury switch 20 is mounted. A slot 21 is formed in the wall portion 17 of holder 16, the purpose of which will become apparent as this disclosure proceeds.

The mercury switch 20 which is mounted in the holder 16 of the main body portion 11 of float 10 fits into the aperture formed by the wall 17 of the holder and is held in that position through the gripping or biasing effect of the slightly inclined or tapered wall. This mercury switch is of the type designed to operate upon tilt, or rotational movement with respect to the force of gravity. The particular mercury switch shown here is a conventional double end mercury switch well known in the art of control devices. It includes a pair of electrodes 22, 23, in each end of a sealed glass envelope 24 which is partially filled with a conducting liquid such as mercury body 25. Conductors 26a, 26b, 26c, and 26d, connected to the individual ends of the exposed electrodes extend through an insulating and protective end covering 27 at each end of the switch in a conventional manner. In the particular switch shown in Figure 1 of the drawings, one of the electrodes 22 is connected by means of its conductor 26b to one of the electrodes 23 in the opposite end of the envelope so that only three conductors 26a, 26c, and 26d are brought out from the switch. With this connection the switch acts as a single pole double throw switch. When switch 20 is inserted in the holder 16 of the float 10, the extremity of the switch having a single conductor 26a will be inserted in the holder, and this single conductor 26a common to one of the electrodes 22 will be inserted into the slot 21 in the wall 17 of holder 16. In this manner the switch will be accurately positioned within the holder and firmly secured thereto through the combined action of the wall of the holder and the effect of the conductor 26a in the slot 21.

While mercury switch 20 is shown mounted in the holder 16 formed integral with the main body portion 11 of float 10, it is to be understood that this switch may be mounted in any suitable holder fitted into the main body portion 11 of the float such holder having means for carrying the switch. Further, it is to be understood that the disclosure of a mercury switch as a circuit controller or position sensing device is to be considered as illustrative only and any controller adapted to complete this circuit or give a signal output upon tilt may be employed within the float.

Mercury switch 20 as shown in Figure 1 is connected to conductors 26a, 26c, and 26d which extend through the main body portion 11 of the float or through the tube-like portion 12 where they are bedded or suitably housed in a cylindrical rod 30. Conductors 26a, 26c, and 26d extend through the rod 30 and through the tube-like portion 12 of float 10 so that they may be connected to external circuits (not shown) in which it is desired to employ the control device. Rod 30 is made of an insulating material, such as hard rubber, and extends into the main body portion 11 of the float and out through the flange or lip portion 13 at the open extremity of the float member completely filling the tube-like portion 12 of the float. As shown in Figure 2, rod 30 also includes a filling stem or tube 31 of suitable material such as glass or metal which is similarly housed or bedded in the rod. The rod member 30 serves not only to give a fixed form to the float at the tube-like portion but aids in the mounting of the float and the sealing of the same as will be later described.

The rod member 30 surrounded by tube-like portion 12 of float 10 extends through an aperture 32 in a coupling member 33, this aperture or bore being of a diameter sufficient to accommodate the rod and float in an assembled relationship. The flange or lip portion 13 of the float which is normal to the tube-like portion 12 is positioned against an end face 34 of the coupling in such proximity that a seal can be formed between the two. Coupling 33 is formed with threaded sections 35, 36 at either extremity with a raised tool engaging section 37 therebetween. The threaded portion 35 of coupling 33 which is located nearest the end 34 of the flange 13 is adapted to receive a second coupling member 40 which is generally cup-shaped form having an inner threaded surface, as at 41 which fits over and threads onto the threaded portion 35 of the coupling 33.

Coupling 40 has a shoulder portion 42 adapted to engage a lip or rib 43 of the flange portion 13 of float 10 and press it into and against the surface 34 of coupling 33 to give a fluid type seal between the surface and the float. Coupling 40 also has an aperture 45 in the center thereof through which the rod 30 extends. A sealing gasket 46, annular in form, is slid over the end of rod 30 and against the flange portion 13 of float 10 for the purpose of effecting a seal between the float and the rod member 30. Coupling 40 as it is threaded onto the threaded portion 35 of coupling 33 engages this gasket and presses it into this sealing engagement. In this manner a seal is effected between the float and the coupling, and between the float and the rod, thereby leaving the filling tube 31 as the only passage into the main body of the float.

Coupling 33 is constructed at its opposite or threaded extremity 36 with a suitable pipe thread and is adapted to fit into or be threaded into a wall 60 of a boiler or vessel within which it is desired to have an indication of level of a liquid or a control effect responsive to the level of the liquid. The threaded portion 36 of coupling 33 threads into a cooperating tapped aperture in the wall 60 of the boiler, the pipe thread connection forming a seal between these members.

Float 10 when assembled and positioned within the wall of a boiler or vessel can be used to give an indication of level of a liquid within the vessel or boiler or further control a feed boiler valve in a conventional manner. Float 10 is adapted to float on the surface of the liquid at a level depending upon its buoyancy. As the level of the liquid within the vessel boiler changes, the float will pivot in the region of the tube-like portion as it extends through the wall of the vessel. In this manner the float provides its own pivot. Since its walls are flexible, pivotal movement will vary along the extent of the float. As the float 10 rises and falls with level of the liquid its pivotal movement causes the mercury switch 20 therein to tilt with respect to the force of gravity and make and break respectively the circuits through the electrodes at the opposite ends of the switch. Since the switch is securely attached to the float proper it will consequently be guided by movement of the float and operate upon the variation or change of level of the liquid which causes movement of the float. This provides a simplified pivotal mounting structure for both float and switch.

The float 10 after it has been assembled will be inflated with a given air pressure comparable to the working pressure of the boiler through stem 31 and the stem sealed by any suitable means, such as crimping, as at 31. Assuming that the boiler or vessel be closed and the pressure therein varies, as normally occurs within automatically fired boilers, the difference in pressures between the inside of the float and the surrounding atmosphere will cause the float to expand or contract thereby removing any scale which may form on the outer walls thereof and prohibiting any deposit of scale upon the movable portion of the control apparatus. Thus the liquid level at which the switch is actuated will remain unchanged.

While the floats herein have been shown as one mounted for pivotal movement through its own elastic flexible structure, it is to be understood that the float may be mounted on any suitable pivoting surface or member or may be designed for vertical movement within a boiler or vessel. In such case, the particular construction employed herein can be used advantageously in the prohibition of deposit of scale on the float proper.

In considering this invention, therefore, it should be kept in mind that the present disclosure is intended to be illustrative only and the scope of the invention is to be determined only by the appended claims.

I claim as my invention:

1. A float comprising a main body portion of a rubber material and having a slender tube-like portion at the opposite extremity integral with the main body portion and of the same material terminating in a flared opening, a control device operable upon tilt positioned within said main body portion of said float, means within said float for mounting said control device, a rod-like member including a plurality of conductors and a filling tube positioned in and sealed within said tube-like portion and extending beyond the flared opening at one extremity and into said main body portion at the other extremity, said conductors of said rod being connected to said control device, said flared end of said float being adapted to be secured between portions of a multi-part coupling which in turn is adapted to be threaded into a wall of a boiler within which a fluid varies in quantity and pressure, and means including said tube and said coupling for sealing said float in a slightly inflated condition with a pressure comparable to the pressure within the boiler, said float being adapted to pivot about a part of said tube-like portion of said float to operate said control device.

2. A float means adapted to be mounted within a boiler within which a fluid varies in quantity and pressure, comprising, a hollow thin walled member of flexible and expansible material having an enlarged main body portion and a slender tube like portion at the opposite extremity integral with the main body portion terminating in a flared opening, a control device operable upon tilt positioned within said main body portion of said member, means within said main body portion and integral therewith for mounting said control device, a rod like member including a plurality of conductors and a hollow filling stem positioned and sealed within said tube like portion and extending beyond said flared opening at one extremity and into said main body portion of said member at the other extremity, said conductors of said rod like member being connected to said control device, a connector member adapted to be threaded into the wall of the boiler and to mount said member at said flared opening, means including said rod like member and said coupling for sealing said member to said boiler and said rod like member, and means including said filling stem for filling said member with a gas to a pressure comparable to the pressure of said boiler and sealing said member in such inflated condition so that said member expands and contracts with variation in pressure within the boiler.

3. A float means adapted to be mounted within a boiler within which a fluid varies in quantity and pressure, comprising, a hollow thin walled member of rubber having an enlarged main body portion and a slender tube like portion at the opposite extremity thereof integral with the main body portion and terminating in a flared opening, a mercury switch operable upon tilt position within said main body portion of said member, means within said main body portion and integral therewith for mounting said mercury switch in a fixed angular relationship with respect to said main body portion of said float, a rod like member including a plurality of conductors in a hollow filling stem positioned in and sealed within said tube like portion of said float and extending beyond said flared opening in one extremity and into said main body portion of said float at the other extremity, said conductors of said rod like member being connected to said mercury switch within said main body portion of said member, a connector member adapted to be threaded into the wall of the boiler and mount said member at said flared extremity for pivotal movement within the boiler, means including said rod like member and said coupling for sealing said member to said boiler and said rod like member, and means including said filling stem for filling said member with a gas to a pressure comparable to the pressure of the boiler and sealing said member in such inflated condition so that said member floats in said boiler and expands and contracts with variation in pressure within the boiler.

4. A float comprising a main body portion of a rubber material and having a slender tube like portion at the opposite extremity integral with the main body portion and of the same material terminating in the flared opening, a mercury switch including a sealed envelope with electrodes and a body of mercury therein positioned within said main body portion of said float, means within and integral with said main body portion of said float for receiving and gripping one extremity of said switch envelope to mount said switch in a fixed angular relationship relative to said main body portion of said float, a rod like member including a plurality of conductors and a filling stem positioned in and sealed within said tube like portion and extending beyond a flared opening at one extremity and into said main body portion at the other extremity, said conductors of said rod like member being connected to the electrodes of said mercury switch within said main body portion of said float, said flared extremity of said float being adapted to be secured between portions of a multi-part coupling which in turn is adapted to be threaded into the wall of a boiler within which a fluid varies in quantity and pressure, and means including said filling stem and said coupling for sealing said float in a slightly inflated condition with a pressure comparable to the pressure within the boiler, said float being adapted to pivot about a part of said tube like portion of said float to operate said mercury switch.

5. A float comprising a main body portion of a flexible and expansible material and having a slender tube like portion at the opposite extremity integral with the main body portion and terminating in a flared opening, a mercury switch including a sealed envelope with electrodes and a body of mercury therein positioned within said main body portion of said float, means within the main body portion of said float for receiving and gripping one extremity of said switch envelope to mount said switch envelope in a fixed angular relationship relative to the main body portion of said float, a rod like member including a plurality of conductors and a filling stem each in a pressure tight relationship with said rod like member positioned in and sealed within said tube like portion of said float and extending beyond the flared opening of said float at one extremity and into said main body portion of said float at the other extremity, said conductors of said rod like member being connected to said electrodes of said mercury switch, a multipart coupling mounting said float at said flared extremity thereof and in turn being adapted to be threaded into the wall of a boiler within which a fluid varies in quantity and pressure, and means including said filling stem and said multipart coupling for sealing said float in a slightly inflated condition with a pressure comparable to the pressure within the boiler, said float being adapted to pivot about a part of said tube like portion thereof and expand and contract with variation in pressure of the boiler, said angular relationship between said float and said switch remaining constant with expansion and contraction of said float.

WARREN S. STUTZMAN.

REFERENCES CITED

The following references are of record in the file of this patent:

UNITED STATES PATENTS

| Number | Name | Date |
|---|---|---|
| 622,116 | Caspari | Mar. 28, 1899 |
| 842,082 | Clayton | Jan. 22, 1907 |
| 1,809,642 | Sperry | June 9, 1931 |
| 2,136,220 | Shepherd | Nov. 8, 1938 |
| 2,470,630 | Marcou | May 17, 1949 |

FOREIGN PATENTS

| Number | Country | Date |
|---|---|---|
| 43,965 | Austria | Sept. 10, 1910 |